United States Patent
Wolters et al.

(10) Patent No.: US 9,150,356 B2
(45) Date of Patent: Oct. 6, 2015

(54) ROLLER CONVEYOR CURVE WITH ROUND DRIVE BELTS

(75) Inventors: Thomas Wolters, Schwalmtal (DE); Siegmund Dudek, Heinsberg (DE)

(73) Assignee: INTERROLL HOLDING AG (CH)

(*) Notice: Subject to any disclaimer, the term of this patent is extended or adjusted under 35 U.S.C. 154(b) by 67 days.

(21) Appl. No.: 13/885,813

(22) PCT Filed: May 31, 2012

(86) PCT No.: PCT/EP2012/002317
§ 371 (c)(1),
(2), (4) Date: May 16, 2013

(87) PCT Pub. No.: WO2012/171616
PCT Pub. Date: Dec. 20, 2012

(65) Prior Publication Data
US 2013/0233679 A1  Sep. 12, 2013

(30) Foreign Application Priority Data
Jun. 14, 2011 (DE) .......................... 10 2011 104 190

(51) Int. Cl.
B65G 13/08 (2006.01)
B65G 13/02 (2006.01)
B65G 13/07 (2006.01)
B65G 13/071 (2006.01)

(52) U.S. Cl.
CPC ............ *B65G 13/07* (2013.01); *B65G 13/071* (2013.01); *B65G 13/08* (2013.01)

(58) Field of Classification Search
CPC ..................................... B65G 13/071
USPC ........ 198/781, 781.01, 781.03, 783, 790, 831
See application file for complete search history.

(56) References Cited

U.S. PATENT DOCUMENTS

| | | | |
|---|---|---|---|
| 3,323,636 A * | 6/1967 | Gotham | 198/790 |
| 4,091,916 A | 5/1978 | Warner | |
| 4,096,942 A * | 6/1978 | Shepherd | 198/781.06 |
| 4,196,312 A * | 4/1980 | DeGood et al. | 198/781.1 |
| 4,238,029 A * | 12/1980 | Pirro, Jr. | 198/781.06 |
| 4,278,166 A * | 7/1981 | Pirro, Jr. | 198/781.04 |
| 4,488,639 A * | 12/1984 | Vogt et al. | 198/787 |
| 5,209,342 A | 5/1993 | vom Stein | |
| 5,826,702 A | 10/1998 | Gibson et al. | |

(Continued)

FOREIGN PATENT DOCUMENTS

| | | |
|---|---|---|
| CN | 2522384 | 11/2002 |
| CN | 1507406 | 6/2004 |

(Continued)

OTHER PUBLICATIONS

Chinese Office Action—May 27, 2014.
(Continued)

*Primary Examiner* — Douglas Hess
(74) *Attorney, Agent, or Firm* — Gerald E. Hespos; Michael J. Porco; Matthew T. Hespos

(57) ABSTRACT

A curved roller conveyor (1) with a conveyor frame (10) and a plurality of conveyor rollers (20) rotatably supported on the conveyor frame (10), wherein the curved conveyor (1) has a drive system (30) with a drive belt (31) having a round cross-section, wherein several conveyor rollers (20) rest on the drive belt (31) in a floating manner.

16 Claims, 5 Drawing Sheets

(56) References Cited

U.S. PATENT DOCUMENTS

| | | | | |
|---|---|---|---|---|
| 5,988,362 | A | * | 11/1999 | Nakamura et al. .............. 198/831 |
| 6,390,286 | B1 | * | 5/2002 | Nguyen et al. ............ 198/781.08 |
| 7,299,909 | B1 | | 11/2007 | Houghton |
| 7,398,874 | B2 | * | 7/2008 | Deur ............................. 198/780 |
| 7,540,375 | B2 | * | 6/2009 | Freudelsperger ............. 198/831 |
| 8,763,789 | B2 | * | 7/2014 | Wallace ........................ 198/787 |

FOREIGN PATENT DOCUMENTS

| | | |
|---|---|---|
| CN | 2830329 | 10/2006 |
| CN | 201144109 | 11/2008 |
| DE | 1 756 448 | 8/1970 |
| DE | 2 003 785 | 10/1970 |
| DE | 2 152 204 | 4/1973 |
| DE | 7246322 | 4/1973 |
| DE | 2 213 291 | 9/1973 |
| DE | 25 22 348 | 8/1984 |
| DE | 89 04 162 | 11/1989 |
| DE | 0 506 994 | 10/1992 |
| DE | 42 09 756 | 9/1993 |
| FR | 2 799 452 | 4/2001 |
| JP | 55123804 | 9/1980 |

OTHER PUBLICATIONS

Canadian Office Action Jun. 16, 2014.
German Examination Report of Dec. 6, 2011.
International Search Report of Nov. 14, 2012.

* cited by examiner

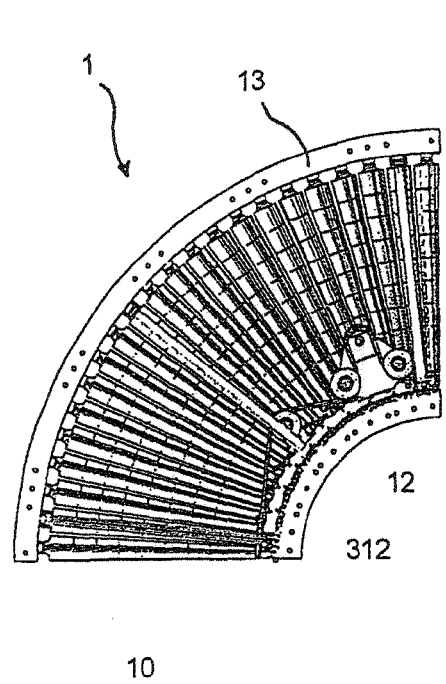
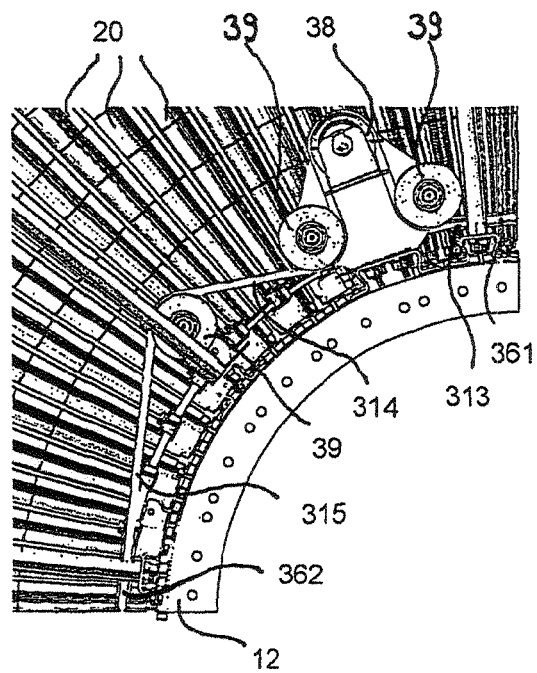
Fig. 2a  Fig. 2b
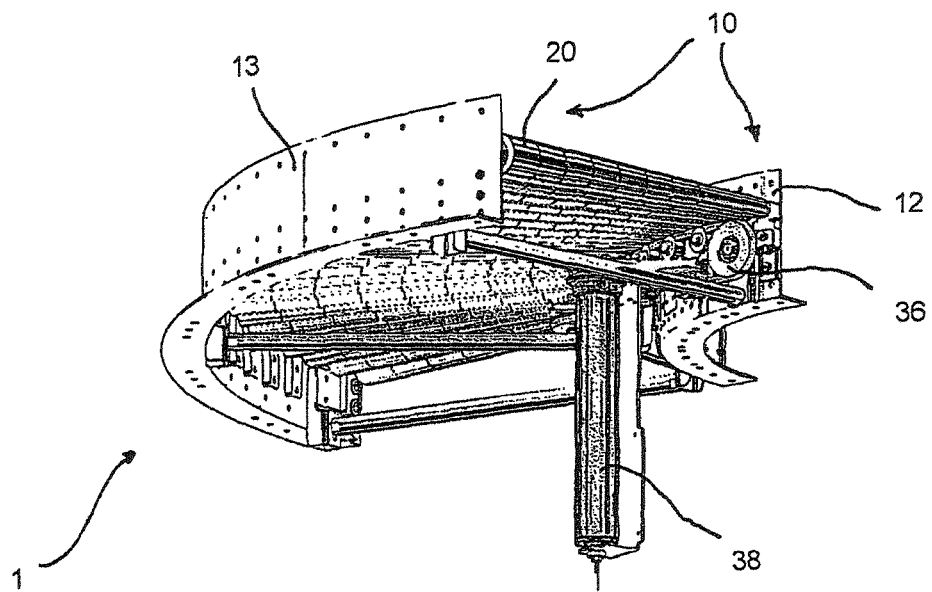
Fig. 2c

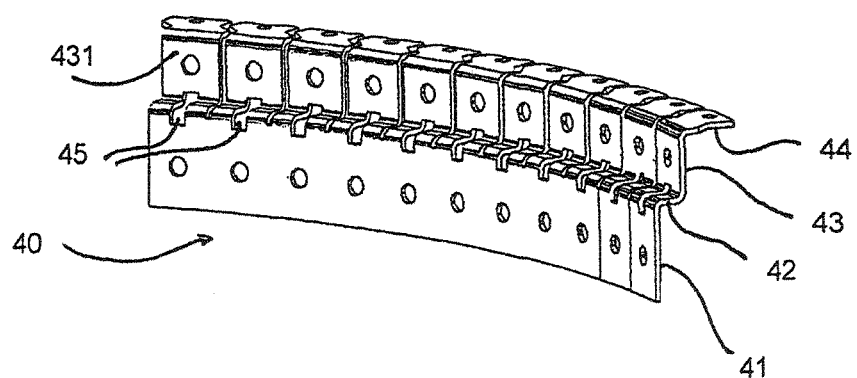
Fig. 5
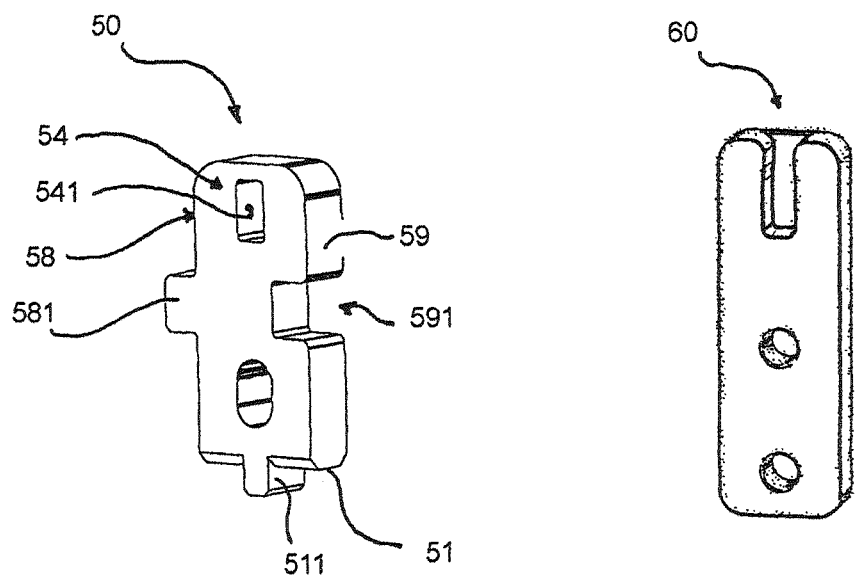
Fig. 6
Fig. 7

ROLLER CONVEYOR CURVE WITH ROUND DRIVE BELTS

BACKGROUND

1. Field of the Invention

The present invention relates to a novel construction of driven roller tracks and to the components thereof.

2. Description of the Related Art

Thanks to many variants, roller tracks are the ideal way of transporting various goods.

Among others, roller conveyors are also used to connect belt conveyors on a straight section or in curves. This often requires buffers capable of compensating for different clock cycles of machines. Here, accumulating conveyors with which an accumulating function can be obtained are sometimes used, which makes sense particularly for interlinking of machines.

Among others, roller tracks can be used as light roller tracks or as standard roller conveyors.

Light roller tracks, which are also referred to as minute roller conveyors, serve to transport small, light goods to be conveyed, in particular over short distances. Generally, light roller tracks transport general cargo of at most 15 kg per meter at a conveyor speed of approximately 1 m/s. For example, a light roller conveyor having a length of 2 meters may be comprised of 57 rollers, each having a diameter of 30 mm (30 mm roller) and a roller pitch of 35 mm, so that also small goods can be transported securely without getting caught in the roller track.

Standard roller conveyors have rollers with a 50 mm diameter (50 mm roller) and a roller pitch of approximately 75 mm and more. The rollers are made of plastics or metal. Roller conveyors are stationary units in conveying engineering, which move general cargo over an assembly of rollers.

There are different drive concepts for driven roller tracks.

In the case of straight conveyors, chains are used at higher driving torque and lower speeds, whereas poly-V belts are used at medium torque and round-section belts at lower torque. Sometimes, flat belts are used as well. The arrangement of the belt may be in a tangential manner to the driven rollers or in a wrapping manner to the driven rollers. In the latter case, a drive may be accomplished from roller to roller or by means of a driveshaft.

With a tangential drive, the belt contacts the roller tangentially. Here, the belt is supported either by support rollers or by means of a slide rail, so that the required normal force between the conveyor roller and the belt is achieved. Depending on the belt used and the torque to be transmitted, a more or less strong pretension of the belt is required.

In particular in the case of the tangential drive, the belts have to be shortened to the required length and welded together on the spot, or additional idler pulleys and complex tensioning devices have to be used if prefabricated drive belts of a predetermined length are to be used. It has to be taken into account that only a few conveying means can be shortened to the desired length anyway and that the welding quality is difficult to ensure on the spot.

For a targeted effect, the transmission element always has to be tensioned strongly and be retensioned regularly. Too low a tension can lead to strong strand vibrations or to a skipping of the teeth on the tooth lock washer. Too high forces cause a strong load on the bearings and the belt, and influence the gear components negatively by signs of wear. Moreover, high forces, a strong rigidity of the belt, a plurality of belt redirections and/or the use of slide rails lead to a strong friction loss, to wear, and to an unnecessary energy loss.

In the case of a roller-to-roller drive, one roller connected to a drive motor drives the subsequent roller by means of a transmission element in a usually nonpositive manner. A further transmission element can drive the next subsequent roller, etc. Here, the transmission elements wrap around half of the roller each.

For a large number of rollers, many transmission elements are required, so that friction and thus energy consumption and wear increase. For a roller conveyor having a length of 2 m and rollers of 30 mm, approximately 60 belts are required. The speed loss has a negative effect here as well, since due to the slip during each transmission from belt to roller the last roller may exhibit a clearly different rotational speed than the first driven roller. In order to avoid these disadvantages, motorized rollers are used to some extent. These motorized rollers are integrated across the roller track section, so that one motorized roller, via round-section belts, drives e.g. four rollers in front of and after the motorized roller in a continuous manner.

A drive by means of a driveshaft also requires many wraps of the transmission element, which leads to corresponding friction losses. Moreover, the assembly of the transmission element is complex.

Therefore, for driven roller tracks, in particular for light roller tracks in which all or at least a major part of the rollers are/is to be driven, there is the problem that a plurality of driven rollers, having their own drive unit, can only be realized in a complex and expensive manner. Driven roller tracks, in which a plurality of rollers is driven via a drive unit, require a comparatively strong drive unit, since the power transmission from the drive unit involves friction and thus entails high energy consumption. In addition, a friction-involving operation often leads to wear and to a premature failure of components of the roller track.

The above problems occur both with straight conveyors and with curved conveyors, curved conveyors being more likely problematic, since a drive along a curve requires a corresponding redirection of the transmission element or transmission elements, which can lead to more friction loss and wear.

It therefore is the object of the invention to provide an easy-to-assemble roller conveyor, which is easy to mount, versatile in use, reliable, and consumes little energy during operation.

SUMMARY OF THE INVENTION

A first aspect of solving the object relates to a curved roller conveyor with a conveyor frame and a plurality of conveyor rollers rotatably supported on the conveyor frame, wherein the curved conveyor has a drive system with a drive belt having a round cross-section, wherein several conveyor rollers rest on the drive belt in a floating manner.

A drive belt having a round cross section can also be referred to as a round-section belt. The cross-section of the drive belt can be circular. The drive belt can be formed as a PU round-section belt. The PU round-section belt can be produced using polyurethane (PU). The term "resting in a floating manner" means that the conveyor roller rests on the drive belt such that the drive belt contacts the conveyor roller only tangentially from below. The term curved roller conveyor refers to a roller conveyor that conveys goods to be conveyed along a curve, in particular along a circle segment. The conveyor frame of the curved roller conveyor can have a circularly bent inner profile on which the conveyor rollers are supported on the curve inner side, wherein the rotation axes of the conveyor rollers coincide with the radius vectors that start from the circle center of the circle associated with the circularly bent inner profile. The conveyor frame of the curved roller conveyor can further have a circularly bent outer profile on which the conveyor rollers are supported on the curve outer side. The inner profile and the outer profile can have the same circle center. The circle segment may be a 30° segment, a 45° segment, a 60° segment, or a 90° segment. Other angular ranges are conceivable as well. The area of the drive belt on which the conveyor rollers rest can be referred to as the upper strand or tight side.

In one embodiment of the above-described curved roller conveyor, the drive belt can rest on a plurality of carrier rollers on the side opposite to the conveyor rollers, wherein the drive belt is supported by a plurality of support rollers on the curve inner side, so that on the curve inner side the drive belt runs along a polygon curve following the conveying curve.

The side opposite to the conveyor rollers refers to the bottom side of the upper strand. The carrier rollers can have a substantially horizontal rotation axis. Substantially horizontal also comprises the support of the carrier rollers, in which the rotation axis of the carrier rollers is parallel to the rotation axis of the conveyor rollers or parallel to a tangential plane, which is tangent to the roller surfaces. Here, the rotation axes of the carrier rollers can lie in one plane, which in the respective contact point between carrier roller and drive belt is perpendicular to the drive belt.

In a further curved roller conveyor according to a further embodiment of one of the above-described curved roller conveyors, the ratio between the number of driven conveyor rollers F and the number of support rollers S can correspond to the relation $0.5 \leq F/S \leq 4$.

The smaller the ratio is selected, the finer the polygon curve, or line, along which the drive belt runs is stepped. This ensures that the drive belt course in the area of the contact point with the surface of the conveyor roller comes closer to the ideal, lowest-friction and thus lowest-wear drive belt course. The lowest-friction drive belt course corresponds, in the contact point, to a tangent on the surface of the conveyor roller surface, which is perpendicular to the conveyor roller axis. Since the conveyor roller surface of a conveyor roller of a curved conveyor is usually formed as a cone, such a tangent would run in a plane perpendicular to the rotation axis of the cone and contacting the circular cross section of the cone. Such an ideal course can be obtained e.g. if respectively one support roller is arranged on a circular line with the center of the circle of curvature of the conveying curve and centrally between two conveyor rollers. It applies to the arrangement of the support rollers in relation to the carrier rollers that the lowest-friction drive belt course corresponds to a tangent perpendicular to the carrier roller axis. If a carrier roller is directly below a support roller, this ideal course is not achieved fully. However, it has turned out that in such an embodiment the drive belt is more stable in its position and has fewer tendencies to come away from its guided position, so that a more trouble-free operation can be ensured. Moreover, it has been shown in tests that a ratio of F/S=2 results in a sufficiently finely stepped polygon curve.

In a further embodiment of one of the above-described curved roller conveyors, the rotation axes of the support rollers can each have a vertical course or a course inclined toward the curve outer side.

A perpendicular course of the rotation axes of the support rollers means that the rotation axes of the support rollers are perpendicular to the conveying plane and are parallel to each other. In the case of cylindrical rollers, this has the effect that no force components, which are directed transversely to the course of the drive belt, result from the pressing force of the drive belt onto the support roller. Therefore, the risk of the drive belt slipping off and thus an interruption of the operation of the roller conveyor are prevented. It has been shown that in this case it is sufficient to hold down the round-section belt only by the weight of the conveyor rollers which rest on it in a floating manner. A course inclined toward the curve outer side refers to a course in which the upper end of the rotation axis, i.e. the conveyor-roller-side end, is inclined toward the outer side of the conveying curve. With a cylindrical support roller, a force component of the pressing force between the drive belt and the support is generated, which presses the drive belt down onto the carrier rollers, so that in this embodiment as well the drive belt is prevented from slipping off. Since the drive belt is not only tangent to the support rollers but wraps around them by an angle, although a small angle, an inclination of the support rollers toward the curve outer side can cause a slight relative movement and thus friction and wear between drive belt and support roller. The smaller the inclination of the rotation axis of the support roller, the less the relative movement that occurs. An inclination between 0° and 5°, in particular an inclination between 0° and 2°, has turned out to be unproblematic with regard to friction and wear. Alternatively or in addition to the corresponding inclination of the roller axes of the support rollers, the surfaces of the support rollers can be configured conically, so that the risk of the belt slipping off is reduced.

In yet another embodiment of one of the above-described curved roller conveyors, the support rollers and/or the carrier rollers can be configured as rollers having circular cylindrical or circular cone-shaped surfaces.

This surface geometry has the effect that the contact between the drive belt and the carrier rollers and the contact between the drive belt and the support rollers in a direction transverse to the course of the drive belt only happens at one point of the respective roller surface if a deformation of the drive belt or of the rollers due to the surface pressing is neglected. Since in this way several points of contact of the drive belt with one of the rollers are prevented, points of contact with different relative speeds can be prevented as well. In this way, friction and wear of rollers and drive belt can be reduced. The support rollers and/or the carrier rollers can further be configured as rollers without ribs. A rib is a protrusion on the end face of a roller, which is to prevent the drive belt from slipping off the roller. In the case of contact of the drive belt on the rib of a roller, a different relative movement and thus friction and wear can occur as well. These disadvantages can be avoided with a carrier roller that has no rib.

A further embodiment relates to a curved roller conveyor, wherein the curved roller conveyor further has at least one idler pulley with a concave resting surface.

A idler pulley as defined herein refers to a roller that is arranged at the frontmost or rearmost point of the upper strand and that redirects the upper strand downward or coming from below toward the lower strand.

According to another embodiment of such a curved roller conveyor, the curved roller conveyor can further have a second idler pulley, which is formed as a driving roller.

The rotation axis of the driving roller can be parallel to the radius that extends from the curve center to the center of the driving roller. The driving roller can be connected to an electric motor connected to the driving roller in the axial direction at the driving roller. The driving roller can be formed as a driven conveyor roller, for example. A driven conveyor roller refers to a conveyor roller in which an electric motor is arranged in the interior of the cylindrical roller casing and drives the roller casing. This type of driven conveyor rollers has a small diameter and thus little space requirement in the radial direction. Moreover, driven conveyor rollers are produced in large quantities, so that these drives are available at reasonable prices.

A curved roller conveyor according to another embodiment further has a lower strand idler pulley arranged such that a first part of the lower strand, which coming from the first idler pulley leads to the lower strand idler pulley, runs along a straight line being in a plane that is perpendicular to the rotation axis of the first idler pulley and that passes through the drive belt in the area of the first idler pulley.

In such a curved roller conveyor, only one lower strand idler pulley can be provided. This single lower strand idler pulley can be arranged with respect to the second idler pulley such that a second part of the lower strand, which coming from the second idler pulley leads to the lower strand idler pulley, runs along a straight line being in a plane that is perpendicular to the rotation axis of the second idler pulley and that passes through the drive belt in the area of the second idler pulley. The rotation axis of the lower strand idler pulley can be perpendicular to the conveying plane.

In another embodiment of one of the above-described curved roller conveyors, the curved roller conveyor can have first and second driveless idler pulleys as well as a driving roller arranged in the area of the lower strand.

The driving roller arranged in the area of the lower strand can have a substantially perpendicular rotation axis or a rotation axis being oblique by more than 5° with respect to the conveying plane. This embodiment offers the advantage, in particular in the case of an oblique rotation axis, that the driving roller only has little space requirement transverse to the conveying plane. In this way, particularly narrow roller conveyors can be realized.

According to a further embodiment, such a curved roller conveyor can have at least one lower strand idler pulley, which is arranged in the area of the lower strand such that the lower strand wraps around the driving roller by at least 180°.

Here, a single lower strand idler pulley can be sufficient. This single lower strand idler pulley can be arranged with respect to the first idler pulley such that a part of the lower strand, which coming from the first idler pulley leads to the lower strand idler pulley, runs along a straight line being in a plane that is perpendicular to the rotation axis of the idler pulley and that passes through the drive belt in the area of the first idler pulley. In this case, the driving roller can be arranged such that a second part of the lower strand, which coming from the second idler pulley leads to the driving roller, runs along a straight line being in a plane that is perpendicular to the rotation axis of the second idler pulley and that passes through the drive belt in the area of the second idler pulley.

In another embodiment, in which the second idler pulley is formed as a driveless idler pulley, two lower strand idler pulleys, which are arranged accordingly and redirect the lower strand toward the driving roller, can be provided, so that the desired wrap angle at the driving roller is obtained. Here, the driving roller can be arranged between the two lower strand idler pulleys, i.e. in the area of the lower strand that extends between the two lower strand idler pulleys. In this embodiment as well, a first part of the lower strand, which coming from the first idler pulley leads to the first lower strand idler pulley, can run along a straight line being in a plane that is perpendicular to the rotation axis of the idler pulley and that passes through the drive belt in the area of the first idler pulley. Correspondingly, in this embodiment, a second part of the lower strand, which coming from the second idler pulley leads to the second lower strand idler pulley, can run along a straight line being in a plane that is perpendicular to the rotation axis of the second idler pulley and that passes through the drive belt in the area of the second idler pulley.

In another embodiment, the conveyor frame of the curved roller conveyor can have an inner profile extending along a circular line and a plurality of conveyor section bearing elements fixed on the inner profile, which each have an elongated hole to form a bearing site, in which an axle end of the conveyor roller is received.

The elongated hole can be formed as a through hole or as a blind hole. The bearing sites can have lateral boundary surfaces, which are parallel to each other at least over a portion of the elongated hole. During operation of such a roller conveyor, the axle ends of the conveyor rollers can move in the elongated bearing sites perpendicularly to the conveying plane, which is formed by the conveyor rollers. This enables a floating support on the drive belt running below the conveyor rollers, in which the conveyor rollers rest on the drive belt due to their weight or the weight of the transported goods. Due to the parallel lateral boundary surfaces, the axle ends or shaft ends of the conveyor rollers can be fixed in the bearing sites in the conveying direction. Since the elongated hole is closed at the top, the axle ends can be prevented from slipping out of the bearing sites. On the curve outer side, corresponding conveyor section bearing elements with bearing sites open at the top can be provided, so that the curve outer side axle ends can be placed into the curve outer side conveyor section bearing elements from above. The conveyor section bearing elements can be cut out of a flat plastic plate, e.g. by means of water jet cutting. Alternatively, the conveyor section bearing elements can be produced in an injection molding process, in particular in a plastic injection molding process.

In such a curved roller conveyor, according to another embodiment, each of the conveyor section bearing elements can have end faces facing the respectively neighboring conveyor section bearing elements, wherein a first lateral end face has a guiding protrusion and a second lateral end face has a corresponding guiding recess, wherein the guiding protrusions of the conveyor section bearing elements each engage guiding recesses of the neighboring conveyor section bearing elements and are configured such that tilting of the conveyor section bearing elements with respect to each other is prevented.

Guiding protrusions and corresponding guiding recesses can particularly be configured such that tilting of the neighboring conveyor section bearing elements with respect to each other is prevented in a plane that is perpendicular to the rotation axes of the conveyor rollers, the axles of which are received in the bearing sites of the conveyor section bearing elements.

A further embodiment relates to one of the above curved roller conveyors, wherein the curved roller conveyor further has a console-like fixing element applied to the inner profile of the conveyor frame, said console-like fixing element being formed as an elongated bent sheet metal part and serving to fix several of the plurality of conveyor section bearing elements.

The fixing element can extend along the circular line in a bent manner, which corresponds to the course of the inner profile. The fixing element can have a fixing area extending along the circular line, which fixing area is fixed, e.g. screwed, riveted, or welded, to the inner profile. A plurality of sheet metal tongues can extend from the fixing area, which are each chamfered by an angle, e.g. by 90°, toward the sheet metal strip on the convex side of the sheet metal strip in the lateral direction. By these chamfers, it is possible to form (horizontal) resting areas on which the conveyor section bearing elements can rest. In the further course of the respective sheet metal tongue, each of these resting areas can be followed by a further portion, which can be formed as a chamfer that extends perpendicularly upward and that can be referred to as a clamping area. The distance of a clamping surface at the clamping area to the inner profile can correspond to the thickness of the corresponding conveyor section bearing element, so that the respective conveyor section bearing element is fixed in the radial direction of the conveying curve.

In such a curved roller conveyor, according to another embodiment, the console-like fixing element can have a plurality of position recesses in which the corresponding position protrusions of the conveyor section bearing elements engage, so that the positions of the conveyor section bearing elements along the inner profile toward the circular line are set in a defined manner.

Here, a position recess can be provided at each sheet metal tongue, for example. The position recess can be formed in the area of the resting area, for example.

In yet another embodiment of the curved roller conveyor, the carrier rollers and/or the support rollers are fixed to the fixing element.

In the further course of the above-described sheet metal tongues after the clamping area, a further chamfer can be provided as a support roller bearing. The support roller bearing can be chamfered by 90° toward the curve outer side in relation to the clamping area. A bearing block can be fixed to the resting console on the curve outer side, in particular be screwed together with the support roller bearing. The carrier rollers and/or the support rollers can be fixed to the bearing block.

According to yet another embodiment of an above-described curved roller conveyor, the conveyor rollers each have at least one axle, at least one conical casing element, and a drive sleeve, wherein the at least one conical casing element and the drive sleeve are rotatably supported about the at least one axle, wherein the drive sleeve rests on the drive belt to establish a drive contact and can be rotated relative to the conical casing element with torque.

In such a configuration, a slip clutch can be created between drive sleeve and casing element by the drive sleeve, with which e.g. abrupt speed differences of goods to be conveyed in relation to the floatingly driven conveyor rollers can be compensated for. Thus, the wear of the drive belt can be reduced clearly.

Such a conveyor roller can have a cylindrical supporting tube, for example, on which the conical casing element is placed. The supporting tube can be rotatably supported about the at least one axle e.g. via rolling-element bearings. The at least one axle can extend integrally, continuously from one end of the supporting tube to the other end, or be formed by two separate axles, which are respectively provided on one end of the supporting tube.

The outside diameter of the supporting tube and the inside diameter of the casing element together can form a press fit, so that the casing element is fixedly seated on the supporting tube. The casing element can be formed integrally or be composed of several conical sub-elements, which each have the same inside diameter, i.e. can each be pressed on the supporting tube. The outside surfaces of the sub-elements can each be formed as different cones with the same inclination, which complement each other to form a conical total surface.

The drive sleeve can be formed as a short annular portion. The annular portion can be pushed onto the supporting tube of the conveyor roller in the area of the drive belt on the curve inner side. Here, the ring can have a width which is only insignificantly greater than the diameter of the drive belt, so that the major part of the width of the conveyor roller is formed by the casing element, the conical surface of which forming the transport surface of the roller conveyor according to this embodiment. The drive sleeve can be seated on the supporting tube with play, so that the drive sleeve in relation to the supporting tube is easier to rotate than the casing element fixedly seated on the supporting tube. For example, the drive sleeve can have a clear inside diameter that is 0.05 mm to 0.8 mm larger than the corresponding outside diameter of the supporting tube. Preferably, the clear inside diameter is 0.08 mm to 0.4 mm larger, in particular in the range of 0.1 mm larger than the corresponding outside diameter of the supporting tube. In this way, it can be ensured that the drive sleeve can be rotated more easily on the supporting tube than the casing element or any sub-element of the casing element by at least the factor 3, preferably by the factor 10. The desired friction between drive sleeve and supporting tube can also be influenced by the material match of the two parts. For example, the supporting tube can be made of metal and the drive sleeve can be made of plastics, in particular of a polyamide material. The drive sleeve can have a cylindrical outside surface. The outside diameter can be dimensioned to be slightly smaller than the adjacent thinnest diameter of the conical-shaped casing element.

In the following, individual embodiments for solving the object will be described by way of example with reference to the figures. The individual, described embodiments partly include features that are not absolutely necessary for realizing the claimed subject matter, but which provide characteristics desired for specific applications. Thus, embodiments not including all features of the embodiments described below are also considered to be disclosed by the described technical teaching. In order to avoid unnecessary repetitions, specific features will only be mentioned with respect to individual embodiments described in the following. It is pointed out that the individual embodiments are not to be contemplated only individually, but also in combination. From this combination, the skilled person will see that individual embodiments can be modified by incorporating one or more features of other embodiments. It is pointed out that a systematic combination of individual embodiments with one or more features described with respect to other embodiments can be desirable and expedient, and therefore is to be taken into consideration and be considered to be comprised by the description.

BRIEF DESCRIPTION OF THE DRAWINGS

FIG. 1b shows a part of FIG. 1a.

FIG. 2a shows a second embodiment of a roller conveyor from below.

FIG. 2b shows a part of FIG. 2a.

FIG. 2c shows the second embodiment of the roller conveyor of FIG. 2a in an isometric view from obliquely below.

FIG. 5 shows a fixing element for fixation of several conveyor-section bearing elements.

FIG. 6 shows a conveyor section bearing element.

FIG. 7 shows a curve outer side bearing element.

DETAILED DESCRIPTION OF THE PREFERRED EMBODIMENTS

Figure 1A:
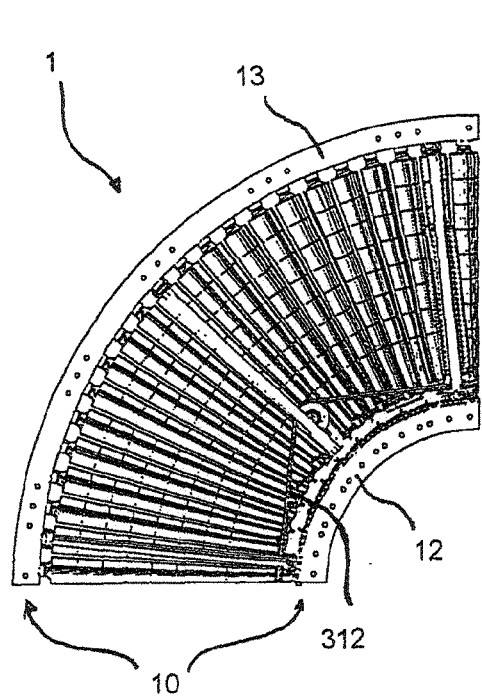
FIG. 1a shows a first embodiment of a roller conveyor from below.
Figure 1B:
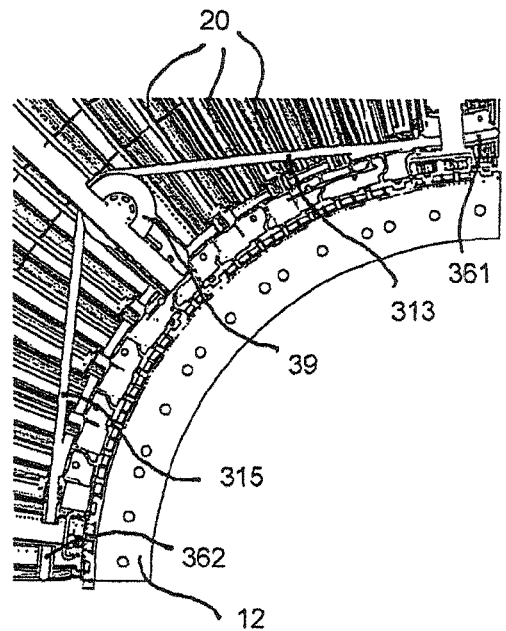
Figure 1C:
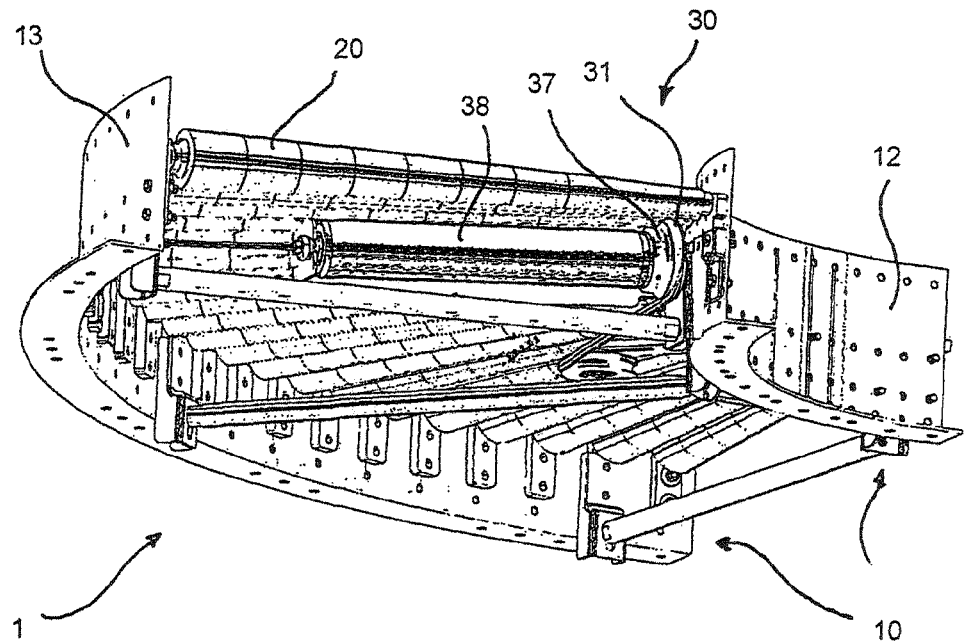
FIG. 1c shows the first embodiment of the roller conveyor of FIG. 1a in an isometric view from obliquely below.

FIGS. 1a to 1c and FIGS. 2a to 2c show two different embodiments of a roller conveyor, which are each formed as a curved roller conveyor 1, the first embodiment comprising a lying drive motor 38 and the second embodiment comprising an upright drive motor 38. FIG. 1 and FIG. 2a each show the entire curve segment from the bottom side of the roller conveyor 1. FIGS. 1b and 2b each show an enlarged part in the same viewing direction. FIGS. 1c and 2c show the respective curve segment in an isometric view from obliquely below.

In the illustrated embodiment, the drive motor 38 is formed in the form of a driven conveyor roller having a driving roller 37 fixed to one axial end thereof. Driven conveyor rollers refer to conveyor rollers that are used as conveyor rollers in roller conveyors and that comprise a drive unit, in particular an electric motor, inside the cylindrical conveyor roller casing. This type of driven conveyor rollers is produced in large quantities and is thus available on the market at reasonable prices. Moreover, compared to other drive motors, driven conveyor rollers have a relatively small diameter, which results in a space-saving construction in particular in the case of the horizontal arrangement of the drive motor 38. In the illustrated embodiment, these driven conveyor rollers are not used as conveyor rollers in a literal sense, since they are arranged below the conveying plane and do not directly contact the goods to be conveyed on the roller conveyor 1.

In both embodiments, the roller conveyor 1 has a conveyor frame 10 having an inner profile 12 and an outer profile 13. Both the inner profile 12 and the outer profile 13 have a curve-shaped course extending along a portion of a circular line in the illustrated embodiments. Here, the circular lines of both the inner profile 12 and the outer profile 13 have the same center, which can also be referred to as the curve center. The illustrated curve segments each describe a 90° segment. Depending on the field of application, curved roller conveyors can also cover different angles.

A plurality of conveyor rollers 20 is arranged between the inner profile 12 and the outer profile 13 along the conveyor section. To support the conveyor rollers, a plurality of conveyor-section bearing elements 50 is provided along the inner profile 12 and a plurality of curve outer side conveyor-section bearing elements 60 is provided along the outer profile 13, which will be described in detail in the following with reference to the other figures.

Both embodiments illustrated comprise a drive belt 31 having a round cross section. The drive belt 31 can also be referred to as a round-section belt. Compared to drive belts having different cross sections, round-section belts have the advantage that they can be bent in arbitrary directions transverse to the longitudinal extension of the belt, so that they can be redirected well in different directions.

In both embodiments, the drive belts 31 are formed as continuous belts, which each have an upper strand 311 and a lower strand 312. The term upper strand 311 refers to the upper portion of the drive belt 31, which runs above the idler pulleys 36. The term lower strand 312 refers to the part of the continuous belt which runs back below the idler pulleys 36 in the illustrated embodiment.

In both embodiments, the upper strand 311 passes on the curve inner side in the area of the inner profile 12 substantially along a portion of a circular line. To this end, a plurality of support rollers 33 supporting the upper strand 311 toward the curve inner side is provided in the area of the inner profile 12. The arrangement of the support rollers 33 will be described in detail with reference to the other figures. Since the upper strand 311 between each support roller 33 runs substantially along a straight line, the course of the upper strand 311 can also be described as a polygon curve. The more support rollers 33 are provided, the more finely the polygon curve is stepped and the more the polygon curve is approximated to a circular line. In the illustrated embodiments, one support roller 33 is provided every two conveyor rollers 20. It is also conceivable that one support roller 33 is provided between two conveyor rollers 20 each, or that only one support roller 33 is provided every three or four conveyor rollers 20.

The curve inner side areas of the conveyor rollers 20 rest on the upper strand 311 tensioned along the curve line. Each of the conveyor rollers 20 is substantially perpendicular to the course of the curve line. Since the course of the upper strand 311 is strongly approximated to the curve line in this area in a polygon-like manner, the upper strand 311 is tangent to each of the conveyor rollers 20 substantially perpendicularly. Therefore, during operation of the roller conveyor 1, the relative movement between the conveyor rollers 20 driven by the upper strand 311 can be described as a substantially rolling transmission, since the relative movement does almost not have a movement component in the longitudinal direction of the respective conveyor roller 20. By means of this configuration, friction and wear of the drive belt can be minimized.

In order to enable a smooth and planar course of the conveying plane and a constant transmission of the driving forces between drive belt 31 and conveyor rollers 20, a plurality of carrier rollers 32 is provided below the upper strand 311, which carry the weight of the conveyor rollers 20 and of the loads conveyed on the roller conveyor 1. The carrier rollers 32 and their fixation will be described in detail with reference to the following figures.

Due to the different arrangements of the drive motor 38, the two embodiments differ in particular with respect to the course of the lower strand 313.

In the embodiment with the lying drive motor 38, which is illustrated in FIGS. 1a, 1b, and 1c, only one lower strand idler pulley 39 is required and one of the idler pulleys 36 is designed as a driving roller 37. Here, the lower strand idler pulley 39 is arranged such that a tangential course of the first part of the lower strand 313 and of the second part of the lower strand 315 to the curve course is ensured. Thus, it is enabled that the lower strand 312 runs off or onto the idler pulleys 361, 362, respectively, both from the first idler pulley 361 and from the second idler pulley 362 perpendicular to the course of the rotation axes of the idler pulleys 361, 362. In this way, the friction between the first idler pulley 361 and the first part of the lower strand 313 as well as the friction between the second idler pulley 362 and the second part of the lower strand 315 is minimized. Therefore, a minimum number of idler pulleys is sufficient in this embodiment, which results in particularly low energy consumption and low noise emissions.

In the embodiment with the upright drive motor 38, which is illustrated in FIGS. 2a, 2b, and 2c, two lower strand idler pulleys 39 are provided, which flank the driving roller 37, so that a wrap angle of the drive belt 31 around the driving roller 37, which is required for force transmission, is ensured. In the illustrated embodiment, a further lower strand idler pulley 39 is provided in order to avoid contact of the lower strand 312 with the inner profile 12. In this embodiment as well, the lower strand idler pulleys 39 are arranged such that a tangential course of the first part of the lower strand 313 and of the second part of the lower strand 315 is ensured. Accordingly, an oblique course of the drive belt 31 to one of the idler pulleys 361, 362 is prevented in this case as well. The perpendicular arrangement of the drive motor 38 results in little space requirement in the radial direction of the curve course. Therefore, clearly narrower roller tracks can be realized in this embodiment.

Depending on the space requirement, further embodiments in which the drive motor 38 can e.g. be oblique are conceivable as well. Here, the round-section belt enables the most varied configurations due to its ability to be redirected in different directions.

In the illustrated embodiments, the drive belts 31 are made of a material comprising polyurethane. PU belts with or without core can be used here. Such PU belts, in particular the PU belts without core, exhibit good elastic properties and can be expanded up to 6% depending on the embodiment. Due to this elasticity, certain tolerances in the arrangement of the different idler pulleys 36 and the lower strand idler pulleys 38 can be compensated for owing to the expandability of the drive belt 31, so that this embodiment can do without a complex belt tensioning device.

With reference to the remaining figures, the conveyor-section bearing elements 50 fixed to the inner profile 12 of the conveyor frame 10, the curve outer side conveyor-section bearing elements 60, and the fixation thereof will be described in the following.

FIG. 6 shows a conveyor-section bearing element 50 in an isometric view from obliquely above.

The conveyor-section bearing element 50 has an elongated bearing site 54. In the illustrated embodiment, the bearing site 54 is formed as a through hole. The bearing site 54 has two substantially parallel bearing site boundary surfaces 541. The bearing site boundary surfaces 541 have a distance to each other which substantially corresponds to the diameter of an axle end 22 of a conveyor roller 20. When one axle end 22 is inserted in the bearing site 54, the axle end can move up or down in the bearing site 54 and is fixed in the lateral direction via the bearing site boundary surfaces 541.

Curve outer side conveyor-section bearing elements 60 can be provided on the other side of the respective conveyor roller 20. These curve outer side conveyor-section bearing elements 60 can have a configuration as shown in FIG. 7. Accordingly, such a curve outer side conveyor-section bearing element 60 can have a bearing site open at the top and one or more fixing holes. The bearing element can be screwed to the outer profile 13 via the fixing holes. This type of fixation is only exemplary. Other types of fixation are conceivable as well. The bearing site open at the top enables an easy assembly of the conveyor rollers, according to which one axle end 22 is inserted in the bearing site 54 of the conveyor-section bearing element 50 first, and then the opposite axle end of the conveyor roller 20 is swiveled into the bearing site, open at the top, of the curve outer side conveyor-section bearing element 60.

At least one fixing element 40 is provided for fixation of the conveyor-section bearing element 50. In the illustrated embodiment, the fixing element 40 has a fixing area 41 for fixing the fixing element 40 to the inner profile 12. Further, the fixing element 40 has a substantially horizontally extending resting area 42. For example, the fixing element 40 can be designed as a bent sheet metal part.

The resting area 42 of the fixing element 40 can serve as a resting surface for a plurality of conveyor section bearing elements 50. Here, the console contact surfaces 51 of the conveyor-section bearing elements 50 can rest on the resting area 42 of the fixing element 40 in a smooth and planar manner, so that an equidistant distance of the lower areas of the bearing sites 54 to the resting area 42 is ensured. Moreover, the conveyor-section bearing elements 50 can each have position protrusions 511 in the area of the console contact surface 51, which can engage corresponding position recesses 45 provided in the resting area 42 of the fixing element 40. In the illustrated embodiment, each conveyor section bearing element 50 has a position protrusion 511, which extends downward from the console contact surface in a nose-like manner.

A defined position of the conveyor-section bearing element 50 in the direction of the course of the upper strand 311 of the drive belt 31 can be ensured by the position recesses 45 and the corresponding position protrusions 511, so that the conveyor rollers 20 each have a defined distance to the neighboring roller. In other embodiments, a conveyor section bearing element 50 can also have several position protrusions 511. It is also conceivable that a conveyor section bearing element 50 has a bent course corresponding to the curvature of the inner profile 12, and several bearing sites. The present configuration of the conveyor section bearing element 50 with only one bearing site 54 per conveyor section bearing element 50 has the advantage that the distance of the conveyor rollers 20 with respect to each other is variable within certain limits. This has the advantage that a conveyor section bearing element 50 having a specific shape and specific dimensions can be used for a plurality of different curved roller conveyors 1. In the realization of different angular ranges to be satisfied by a curved roller conveyor, the conveyor rollers 20 have a different distance with respect to each other.

Moreover, the conveyor section bearing elements each have a first lateral end face 58 on which a guiding protrusion 581 is provided respectively. Further, the conveyor section bearing elements 50 each have a guiding recess 591 on a second lateral end face 59 opposite to the first lateral end face 58, said guiding recess 591 corresponding with the guiding protrusion 581. Accordingly, the guiding protrusion 581 can engage the corresponding guiding recess 591 of the neighboring conveyor section bearing element 50. In the illustrated embodiment, both the guiding recess 591 and the guiding protrusion 581 have parallel guiding surfaces having the same distance. Due to the engagement of the guiding protrusion 581 with the corresponding guiding recess 591, tilting of the conveyor section bearing element 50 in relation to the neighboring conveyor section bearing element 50 is prevented. The arrangement of the conveyor section bearing elements 50 with respect to each other can be seen in FIG. 3.

In the illustrated embodiment of the fixing element 40, the resting area 42 is formed by a plurality of sheet metal tongues extending from the fixing area 41. Here, one sheet metal tongue per conveyor section bearing element 50 is provided. Each sheet metal tongue is bent outward horizontally at first in order to provide the resting area 42 for the respective conveyor section bearing element 50. The position recess 45 is arranged in this area each. In the further course of the respective sheet metal tongue there follows a clamping area 43, which basically extends upward perpendicularly. When the fixing element 40 is fixed to the inner profile 12, clamping surfaces 431 arranged on each sheet metal tongue in the area of the clamping area 43 on the curve inner side have a distance to the surface of the inner profile 12 which corresponds to the material strength of the conveyor section bearing element 50. Accordingly, the surface of the inner profile 12, the resting area 42, and the clamping area 43 together form a channel-like depression into which the conveyor section bearing elements 50 can be inserted. Due to the position protrusions 511, which engage the position recesses 45, the distance of the conveyor section bearing elements 50 with respect to each other is defined. Due to the guiding protrusions 581 and the guiding recesses 591, tilting of the conveyor section bearing elements 50 with respect to each other is prevented. By this configuration, mounting of the components to the conveyor frame 10 of the curved roller conveyor can be facilitated significantly.

The carrier rollers 32 and the support rollers 33 are arranged along the course of the upper strand 311 in a manner displaced by a specific distance in relation to the position of the bearing site 54. In the illustrated embodiment, this specific distance corresponds to half the distance of a conveyor roller 20 to the neighboring conveyor roller 20. By this configuration, it can be achieved that carrier rollers 32 or support rollers are each positioned between two conveyor rollers 32 approximately in a centered manner. By this configuration, a course of the upper strand 311 favorable with respect to friction and wear is achieved.

Figure 3:
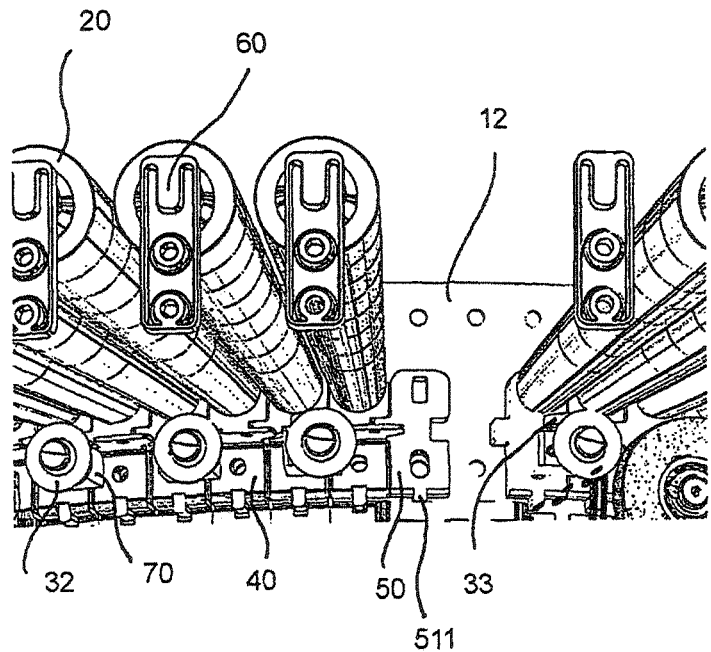
FIG. 3 shows an isometric side view of the roller conveyor, in which some components have been left out in the illustration for explanatory purposes.

FIG. 3 shows that the conveyor section bearing elements 50 are each arranged behind the clamping areas 43 of a sheet metal tongue of the fixing element 40. From this figure, it can also be seen that a carrier roller 32 is arranged every two conveyor rollers 20, said carrier roller 32 carrying the drive belt 31 not illustrated in this figure from below. Above the carrier rollers 32 is arranged a support roller 33 on the curve inner side, when viewed from the drive belt 31.

Figure 4:
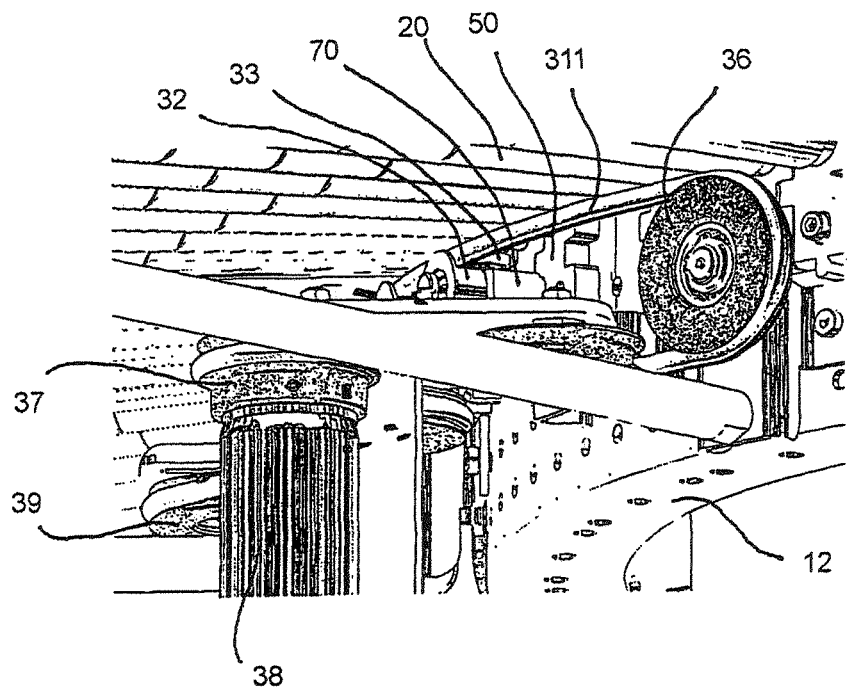
FIG. 4 shows a subarea of the roller conveyor in an isometric view from obliquely below.

The course of the upper strand 311 in relation to the adjacent components is shown in FIG. 4 in more detail.

Here, the carrier rollers 32 and the support rollers 33 are fixed to bearing blocks 70. In the illustrated embodiment, one carrier roller 32 and one support roller 33 per bearing block are provided. The bearing block 70, in turn, is fixed to the clamping area 43 on the outside. To this end, the bearing block can have a thread on the side facing the clamping area 43. Thus, a screw can be put through the inner profile 12, through a hole in the conveyor section bearing element 50, and through a further hole in clamping area 43 and be screwed into the thread of the bearing block 70.

A support roller axle, which supports the support roller 33, can be fixed to the upper side of the bearing block 70. The support roller axle can extend through a hole in a support roller bearing 44, which follows on the clamping area 43 in the horizontal direction as a continuation of the sheet metal tongue. On the side of the bearing block 70 opposite to the clamping area 43, a carrier roller axle carrying the carrier rollers 32 can be fixed.

In the mounted state, the bearing block 70 is arranged such that the carrier roller axles are arranged substantially in the horizontal direction along a radius ray extending from the curve center through the respective carrier roller axle. The support roller axles 56 have an upright, substantially vertical position. Both the carrier rollers 32 and the support rollers 33 have a circular cylindrical shape, so that the drive belt 31 with the round cross-section contacts the rollers only in a punctually. Since the points where the carrier rollers 32 contact the drive belt 31 are half the diameter of the drive belt 31 further away from the curve center than the points where the support rollers 33 contact the drive belt 31, the drive belt, which extends along a circular path around the curve center, has different speeds in these points, so that the support rollers 33 can rotate slightly slower than the carrier rollers 32. Therefore, supporting the drive belt 31 via separate carrier rollers 32 and support rollers 33, in contrast to supporting it via a roller having a concave surface or a carrier roller having a side rib, reduces a rolling transmission of the drive belt at certain surface areas.

In the illustrated embodiment, the carrier rollers are provided with a rib on the curve outer side. Since the drive belt 31 is tensioned toward the inner profile 12, the drive belt 31 does not contact this rib. It has been shown in tests that due to its tension toward the inner profile 12, the drive belt 31 does not tend to slip off the carrier rollers even if the rib illustrated in the figures is omitted. Therefore, the carrier rollers 32 can also be formed as rollers without ribs, which have a rib neither on the curve inner side nor on the curve outer side. Such carrier rollers 32 can further have a circular cylindrical carrier roller surface.

A configuration of the carrier rollers 32 not having a rib on the curve outer side of the respective carrier roller has the advantage of a particularly simple assembly of the drive belt, which does not have to be forced through the narrow gap between carrier roller rib and conveyor rollers when being assembled. In connection with the illustrated embodiments of the lower strand guidance with lying or upright drive motor, the drive belt can be replaced in case of damage without having to demount components of the roller conveyor. Since the PU belt used in the embodiment is elastic and thus no tensioning device is required, no separate adjustment of the drive belt tension is required in the assembly. An exchange of the drive belt can therefore be performed in a very short time. Downtimes can be reduced to a minimum.

Supporting the cylindrical support rollers 33 vertically prevents the pressing force between drive belt 31 and support roller 33 from having a component toward the rotation axis of the support roller 33. Therefore, additional fixing means preventing the drive belt 31 from slipping off the support rollers 33 upward are not required. For this purpose, the weight of the conveyor rollers 20 is also sufficient in the case of strand vibrations, so that in this embodiment a conveyor-section bearing element 50 having a bearing site 54 open at the top could be used as well. In the presently described conveyor-section bearing element 50, however, the bearing site 54 is formed as an elongated hole closed at the top, so that the axle end 23 can only move up until it abuts on the upper end of the bearing sites. In this upper position, the surface area of the conveyor roller 20 arranged on the drive belt side prevents the drive belt from diverting upward, which might cause the drive belt to slip off the support rollers 33.

The idler pulleys 36, one of which is shown in FIG. 4, have a concave surface in the illustrated embodiment, so that the drive belt 31 is securely guided in the wrap area. In particular if one of the idler pulleys 36 is formed as the driving roller 37, as this may be the case with a lying drive motor 38, such a surface configuration makes sense since the force transmission between driving roller 37 and drive belt 31 is also improved in this embodiment.

Figure 8:
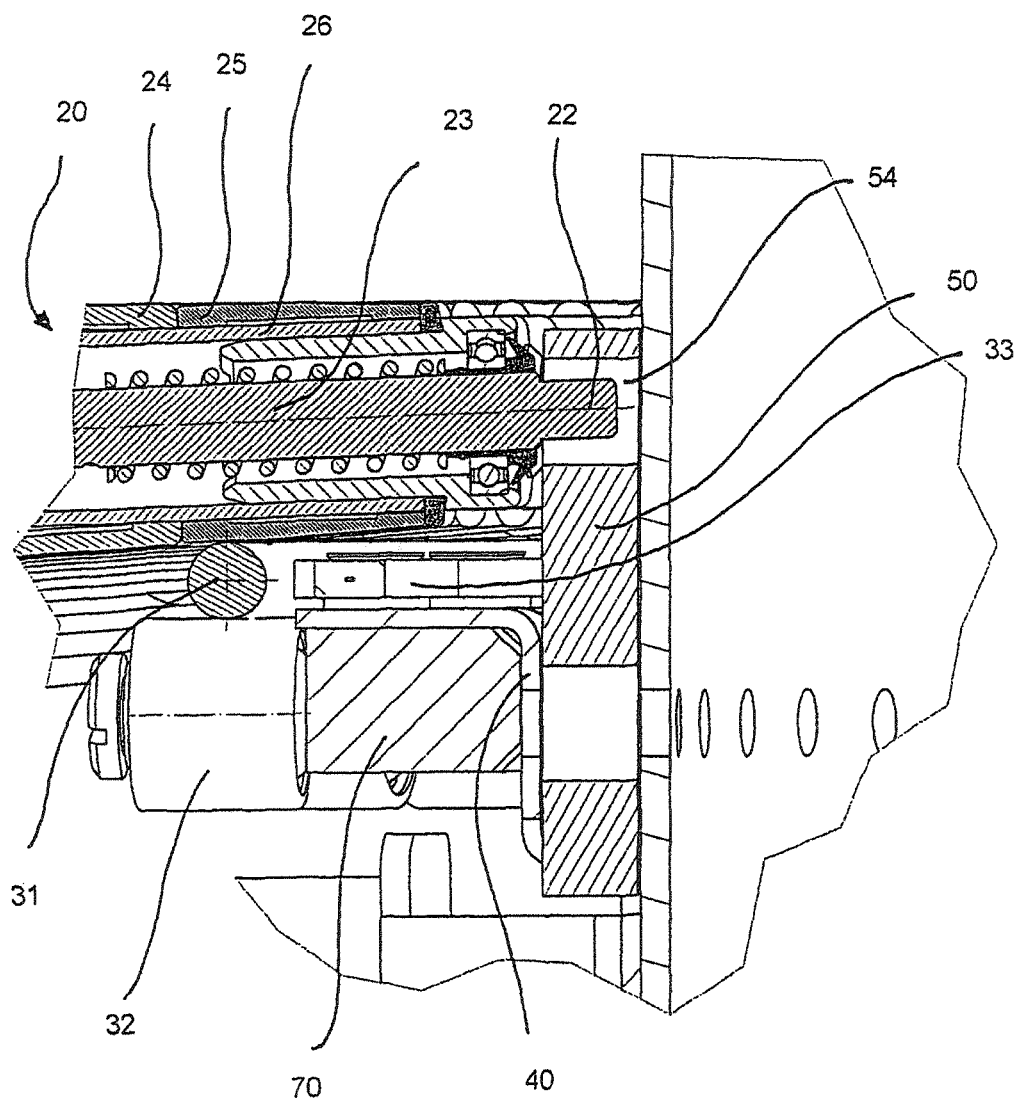
FIG. 8 shows the curve inner side area of a conveyor roller according to another embodiment of the roller conveyor.

FIG. 8 shows the curve inner side area of a conveyor roller 20 according to a further embodiment of the conveyor roller 1.

The illustrated conveyor roller 20 according to this embodiment has a supporting tube 26, which is rotatably supported about an axle 23 via a rolling-element bearing. The axle end 22 of the axle is received in the bearing site 54 of the adjacent conveyor section bearing element 50. The bearing element 54 is fixed to the inner profile 12 via the fixing element 40. On the fixing element 40, one of the bearing blocks is illustrated in section. Behind the sectional plane, the carrier roller 32 arranged on the bearing block and the corresponding support roller 33 can be seen, which carry and support the drive belt, respectively.

The supporting tube 26 can be made of metal, e.g. of steel or an aluminum alloy.

A conical casing element 24 is placed on the supporting tube 26, which can be composed of several conical sub-elements. The casing element 24 is fixedly seated on the supporting tube 26. On the curve inner side, a drive sleeve 25 is placed on the supporting tube 26 directly next to the casing element. There is some play between the drive sleeve 25 and the supporting tube 26, so that the drive sleeve 25 can be rotated about the supporting tube 26 more easily than the sub-elements of the casing element 24 fixedly seated on the supporting tube 26.

The conveyor roller 20 rests on the round drive belt 31 in a floating manner in the area of the drive sleeve 25, so that the drive force can be transmitted from the drive belt 31 to the supporting tube 26 and thus to the conical casing element 24 via the drive sleeve 25. A drive torque of the drive sleeve 25 can thus be transmitted to the casing element 24. The coefficient of friction between the material of the drive sleeve 25 and the material of the supporting tube 26 is lower than the coefficient of friction between the drive sleeve 25 and the drive belt 31.

By this configuration, it is possible to reduce signs of wear, which can e.g. be caused by abrupt speed differences of goods to be conveyed in relation to the driven conveyor rollers, e.g. when the goods to be conveyed in the run onto the curve in the hand-over area between a straight area of a conveyor plant and the curved roller conveyor. In this case, the rotational speed of the casing elements can adjust to the speed without a sliding friction of the conveyor roller on the drive belt 31 being produced. Instead, in this case, the drive sleeve 25 rotates on the supporting tube 26 and further runs off on the drive belt 31. In this way, the wear of the drive belt 31 can be reduced clearly.

If the drive sleeve 25 is made of polyamide, the wear of a drive sleeve 25 pushed onto a metal supporting tube 26 can also be minimized.

In the area in which the drive sleeve 25 is pushed on, the radius of the supporting tube 26 can be selected such that sufficient drive torque is generated due to the large radius in the force transmission point even in the case of a relatively low frictional force between supporting tube 26 and drive sleeve 25. For example, in the area in which the drive sleeve 25 is pushed on, the radius of the supporting tube 26 can be more than 70% of the outside radius of the drive sleeve. Preferably, the radius of the supporting tube 26 can be in the range of 90% of the outside radius of the drive sleeve or above.

The invention claimed is:

1. A curved roller conveyor (1) comprising:
    a conveyor frame (10);
    a plurality of conveyor rollers (20) rotatably supported on the conveyor frame (10);
    a drive system (30) with:
        a drive belt (31) having a round cross-section, several of the conveyor rollers (20) resting on the drive belt (31) in a floating manner,
        a plurality of carrier rollers (32) disposed on a side of the drive belt (31) opposite to the conveyor rollers (20) so that the drive belt (31) rests on the carrier rollers (32),
        a plurality of support rollers (33) on an inner side of the curve defined by the curved roller conveyor (1), the drive belt (31) being supported by the support rollers (33) on the inner side of the curve and running along a polygon curve following the conveying curve,
    wherein the support rollers (33) and the carrier rollers (32) are configured to have circular cylindrical or circular cone-shaped surfaces.

2. The curved roller conveyor (1) according to claim 1, wherein the ratio between the number of driven conveyor rollers F and the number of support rollers S corresponds to the relation 0.5≤F/S≤4.

3. The curved roller conveyor (1) according to claim 2, wherein the rotation axes of the support rollers (33) each have a vertical course or a course inclined toward the curve outer side.

4. The curved roller conveyor (1) according to claim 1, wherein the curved roller conveyor (1) further has at least one idler pulley (36) with a concave resting surface.

5. The curved roller conveyor (1) according to claim 4, wherein the curved roller conveyor (1) further has a second idler pulley (362), which is formed as a driving roller (37).

6. The curved roller conveyor (1) according to claim 5, wherein the curved roller conveyor (1) further has a lower strand idler pulley (39) arranged such that a first part of the lower strand (312), which coming from the first idler pulley (361) leads to the lower strand idler pulley (39), runs along a straight line being in a plane that is perpendicular to the rotation axis of the first idler pulley (361) and that passes through the drive belt (31) in the area of the first idler pulley (361).

7. The curved roller conveyor (1) according to claim 1, wherein the curved roller conveyor (1) has a first and a second driveless idler pulley (361, 362) as well as a driving roller (37) arranged in the area of the lower strand (312).

8. The curved roller conveyor (1) according to claim 7, which has at least one lower strand idler pulley (39) arranged in the area of the lower strand (312) such that the lower strand (312) wraps around the driving roller by at least 180°.

9. The curved roller conveyor (1) according to claim 1, wherein the conveyor frame (10) of the curved roller conveyor (1) has an inner profile extending along a circular line and a plurality of conveyor section bearing elements (50) fixed on the inner profile, which each have an elongated hole to form a bearing site (54), in which an axle end of the conveyor roller (20) is received.

10. The curved roller conveyor (1) according to claim 9, wherein each of the conveyor section bearing elements (50) has end faces facing the respectively neighboring conveyor section bearing elements (50), wherein a first lateral end face (58) has a guiding protrusion (581) and a second lateral end face (59) has a corresponding guiding recess (591), wherein the guiding protrusions (581) of the conveyor section bearing elements (50) each engage guiding recesses (591) of the neighboring conveyor section bearing elements (50) and are configured such that tilting of the conveyor section bearing elements (50) with respect to each other is prevented.

11. The curved roller conveyor (1) according to claim 9, wherein the curved roller conveyor further has a console-like fixing element (40) applied to the inner profile of the conveyor frame (10), said console-like fixing element (40) being formed as an elongated bent sheet metal part and serving to fix several of the plurality of conveyor section bearing elements (50).

12. The curved roller conveyor (1) according to claim 11, in which the console-like fixing element (40) has a plurality of position recesses (45) in which the corresponding position protrusions (511) of the conveyor section bearing elements (50) engage, so that the positions of the conveyor section bearing elements (50) along the inner profile toward the circular line are set in a defined manner.

13. The curved roller conveyor (1) according to claim 11, in which the carrier rollers (32) and/or the support rollers (33) are fixed to the fixing element (40).

14. The curved roller conveyor (1) according to claim 1, in which the conveyor rollers (20) each have at least one axle (23), at least one conical casing element (24), and a drive sleeve (25), wherein the at least one conical casing element (24) and the drive sleeve (25) are rotatably supported about the at least one axle (23), wherein the drive sleeve (25) rests on the drive belt (31) to establish a drive contact and can be rotated relative to the conical casing element (24) with torque.

15. A curved roller conveyor (1) comprising:

a conveyor frame (10);

a plurality of conveyor rollers (20) rotatably supported on the conveyor frame (10);

a drive system (30) with a drive belt (31) having a round cross-section;

several conveyor rollers (20) resting on the drive belt (31) in a floating manner;

a first idler pulley (36) with a concave resting surface;

a second idler pulley (362) formed as a driving roller (37); and a lower strand idler pulley (39) arranged such that a first part of the lower strand (312), which coming from the first idler pulley (361) leads to the lower strand idler pulley (39), runs along a straight line being in a plane that is perpendicular to the rotation axis of the first idler pulley (361) and that passes through the drive belt (31) in the area of the first idler pulley (361).

16. A curved roller conveyor (1), comprising:

a conveyor frame (10) having an inner profile extending along a circular line and a plurality of conveyor section bearing elements (50) fixed on the inner profile, each of the conveyor section bearing elements (50) having an elongated hole to form a bearing site (54);

a drive system (30) with a drive belt (31) having a round cross-section;

a plurality of conveyor rollers (20) rotatably supported on the conveyor frame (10), an axle end of each of the conveyor roller (20) being received in the bearing site (54) of one of the conveyor section bearing elements (50), several conveyor rollers (20) resting on the drive belt (31) in a floating manner, wherein:

each of the conveyor section bearing elements (50) has end faces facing the respectively neighboring conveyor section bearing elements (50), a first lateral end face (58) has a guiding protrusion (581) and a second lateral end face (59) has a corresponding guiding recess (591), and the guiding protrusions (581) of the conveyor section bearing elements (50) each engage guiding recesses (591) of the neighboring conveyor section bearing elements (50) and are configured such that tilting of the conveyor section bearing elements (50) with respect to each other is prevented.

* * * * *